(12) United States Patent
Hunt et al.

(10) Patent No.: US 12,739,528 B2
(45) Date of Patent: Sep. 15, 2026

(54) MONOLITHIC IMAGE SENSOR, A CAMERA MODULE, AN ELECTRONIC DEVICE AND A METHOD FOR OPERATING A CAMERA MODULE

(71) Applicant: Telefonaktiebolaget LM Ericsson (publ), Stockholm (SE)

(72) Inventors: Alexander Hunt, Tygelsjö (SE); Fredrik Dahlgren, Lund (SE); Andreas Kristensson, Södra Sandby (SE); Héctor Caltenco, Oxie (SE); Magnus Olsson, Klagshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 18/713,163

(22) PCT Filed: Nov. 25, 2021

(86) PCT No.: PCT/EP2021/082975

§ 371 (c)(1),
(2) Date: May 23, 2024

(87) PCT Pub. No.: WO2023/093986

PCT Pub. Date: Jun. 1, 2023

(65) Prior Publication Data

US 2025/0016465 A1 Jan. 9, 2025

(51) Int. Cl.
*H04N 25/47* (2023.01)
*H04N 25/702* (2023.01)
(Continued)

(52) U.S. Cl.
CPC ........... *H04N 25/47* (2023.01); *H04N 25/702* (2023.01); *H04N 25/707* (2023.01); *H04N 25/77* (2023.01); *H04N 25/78* (2023.01)

(58) Field of Classification Search
CPC .... H04N 25/47; H04N 25/702; H04N 25/707; H04N 25/77; H04N 25/78
See application file for complete search history.

(56) References Cited

U.S. PATENT DOCUMENTS 7,808,536 B2 10/2010 Yamada et al.
10,110,913 B2 10/2018 Burns et al.
(Continued)

FOREIGN PATENT DOCUMENTS

EP 2117227 B1 5/2014
JP 2004289709 A 10/2004
(Continued)

OTHER PUBLICATIONS

Akin, T. , "CMOS-based Thermal Sensors", Department of Electrical and Electronics Engineering, Middle East Technical University, Ankara, Turkey; Advanced Micro and Nanosystems. vol. 2. CMOS—MEMS., 2005, 479-512.
(Continued)

*Primary Examiner* — Nicholas G Giles
(74) *Attorney, Agent, or Firm* — Murphy, Bilak & Homiller, PLLC

(57) ABSTRACT

A monolithic image sensor (200) comprising: a pixel area (210, 220) sensitive to electromagnetic irradiation and comprising a first pixel area (210) comprising an array of synchronous first image sensor pixels (211) and further comprising a second pixel area (220) comprising hybrid second image sensor pixels (221, 222), a change detector area (230) comprising multiple asynchronous change detectors (231, 232), and a synchronous intensity read-out circuitry (260). A first photoreceptor (215) of a respective first image sensor pixel (211) is electrically coupled to the synchronous intensity read-out circuitry (260). A second photoreceptor (225) of a respective hybrid second image sensor pixel (221, 222) is electrically coupled to the syn-
(Continued)

chronous intensity read-out circuitry (260) with a first connection (241) and electrically coupled to a respective asynchronous change detector (231, 232) out of the multiple asynchronous change detectors (231, 232) with a second connection (242). The change detector area (230) is a distinct part of the image sensor 200 which is separate from the pixel area (201).

18 Claims, 12 Drawing Sheets

(51) Int. Cl.

| | |
|---|---|
| ***H04N 25/707*** | (2023.01) |
| ***H04N 25/77*** | (2023.01) |
| ***H04N 25/78*** | (2023.01) |

(56) References Cited

U.S. PATENT DOCUMENTS

| | | | | |
|---|---|---|---|---|
| 10,283,545 | B2 | 5/2019 | Mlinar et al. | |
| 11,138,428 | B2 | 10/2021 | Skogöet al. | |
| 2012/0293687 | A1 | 11/2012 | Karn et al. | |
| 2014/0009648 | A1 | 1/2014 | Kim et al. | |
| 2015/0097108 | A1 | 4/2015 | Bishay | |
| 2019/0368941 | A1 | 12/2019 | Aziz et al. | |
| 2020/0169675 | A1 | 5/2020 | Stobie et al. | |
| 2021/0185264 | A1* | 6/2021 | Wong | H04N 23/61 |
| 2022/0157083 | A1 | 5/2022 | Jandhyala et al. | |
| 2023/0007208 | A1* | 1/2023 | Wong | H04N 25/77 |

FOREIGN PATENT DOCUMENTS

| | | | |
|---|---|---|---|
| KR | 102276863 | B1 | 7/2021 |
| WO | 2020110484 | A1 | 6/2020 |
| WO | 2020170861 | A1 | 8/2020 |
| WO | 2021159231 | A1 | 8/2021 |
| WO | 2023093986 | A1 | 6/2023 |

OTHER PUBLICATIONS

Clady, Xavier , et al., "A Motion-Based Feature for Event-Based Pattern Recognition", Frontiers in Neuroscience, vol. 10, Article 594, Jan. 2017, 1-20.

Fluke , "How infrared cameras work", Fluke Resource Center, 2022, 1-5.

Lichtsteiner, P , et al., "A 128×128 120 dB 15 US latency asynchronous temporal contrast vision sensor", University of Zurich; IEEE Journal of Solid State Circuits, 2008, 1-13.

Teledyne , "HD Thermal Camera with Viewfinder FLIR T1020", 2021, 1-6.

Unknown, Author , "DARPA Announces Research Teams to Develope Intelligent Event-Based Imagers", Defense Advanced Research Projects Agency, Jul. 5, 2021, 1-3.

Wikipedia , "Event camera", Jul. 18, 2021, 1-5.

* cited by examiner

300

MONOLITHIC IMAGE SENSOR, A CAMERA MODULE, AN ELECTRONIC DEVICE AND A METHOD FOR OPERATING A CAMERA MODULE

TECHNICAL FIELD

The embodiments herein relate to a monolithic image sensor, a camera module, an electronic device and a method for operating the camera module. A corresponding computer program and a computer program carrier are also disclosed.

BACKGROUND

A digital camera for visual or infrared light comprises a digital image sensor. A sensor area of the digital image sensor usually comprises an array of synchronous image pixels arranged in rows and columns. This kind of sensor may also be referred to as a frame-based sensor. Each image pixel comprises a photoreceptor which is coupled to a read-out circuitry. All pixels are read synchronously with respect to a timing of a shutter.

The sensor area may comprise a certain number of pixels. More pixels usually give a higher resolution. A typical technology used for light sensors is a Complementary Metal-Oxide-Semiconductor (CMOS). This type of sensor requires a certain computational effort and processing power in order to resolve an image and estimate how that image may change over time (motion, shape, depth estimation etc.). There are other technologies for image sensors as well like Charge Coupled Device (CCD), e.g., silicon-based CCDs.

Conventional frame-based sensors may have very high resolution, but typically has slow frame rate at the highest resolutions. Furthermore, data transfer from the sensor to an application processor is high and consumes significant power at high resolution unless the frame rate is quite low. Analyzing content of the images to estimate changes such as motion, blurring (e.g., to assist in focus control), shapes, depth etc., may be rather demanding for computational power when resolution is high.

Some of the above-mentioned drawbacks may be overcome by another type of digital camera sensor e.g., an event-based sensor. The event-based sensor may have different names in the literature, such as event camera, neuromorphic camera, Dynamic Vision Sensor (DVS) or silicon retina. The event-based sensor also comprises a photoreceptor and may use CMOS or CCD technology. The event-based sensor may further be silicon-based. However, instead of measuring an analog value from the photoreceptor with an Analog-to-Digital Converter (ADC), the event-based camera comprises a change detector close to the photoreceptor that triggers a digital value based on the luminance change of a scene. At every change up or down in luminance a trigger is sent to a host, such as an image processor in a camera or in a mobile phone, together with a time stamp and a location. The event-based camera is asynchronous, in contrast to the synchronous image sensor. In other words, the event-based sensor responds to local changes in brightness. Event cameras do not capture images using a shutter as conventional cameras do. Instead, each pixel inside an event camera operates independently and asynchronously, reporting changes in brightness as they occur, and staying silent otherwise.

For example, each pixel of an event-based sensor may store a reference brightness level and may continuously compare the reference brightness level to a current level of brightness. If a difference in brightness exceeds a preset threshold, that pixel may resets it reference level and generate an event: a discrete packet of information containing the pixel address and timestamp. Events may also contain the polarity (increase or decrease) of a brightness change, or an instantaneous measurement of the current level of illumination. Thus, event cameras output an asynchronous stream of events triggered by changes in scene illumination.

The event-based camera has some advantages over the synchronous pixel camera such as: 1) low power consumption as there is no readout circuitry and only the pixels that are affected will give an output. 2) High speed, as all pixels do not need to be read at each frame. An event-based camera may detect objects at approximately 10000 times higher speed than conventional synchronous pixel sensors, e.g., 1 000 000 frames per second. 3) High dynamic range, e.g., 100 dB compared to 50 dB for a conventional synchronous pixel sensor.

Image reconstruction from events may be performed and has the potential to create images and video with high dynamic range, high temporal resolution and minimal motion blur. Image reconstruction may be achieved using temporal smoothing, e.g. high-pass or complementary filter.

However, a problem with prior art event-based cameras is that the spatial resolution is low as there is a change detector in each pixel and each change detector is large compared to pixels of synchronous image sensors. The event-based cameras of today have a spatial resolution below 1 megapixel.

There are cameras that combine the two techniques mentioned above, comprising both a conventional sensor and an event-based sensor. The combined sensor may be used with an image analysis solution and may be controlled by decisions made by an application processor, e.g., in a host device, which interfaces both sensors. Drawbacks of such combined systems are multiple: e.g., larger cost and significant more circuit board or silicon die area is usually required, e.g. due to multiple sensor modules with their respective lens systems.

There have also been a few attempts to integrate synchronous pixel functionality into a pixel of an event-based sensor. Asynchronous Time Based Image Sensor (ATIS) is one prior art solution where the change detector triggers a second pixel to also measure a grayscale value in that pixel. This is a pure event-based solution, with a luminance value as well. However, the pixels of this solution are very big as there are two photoreceptors.

Another prior art solution is Dynamic and Active-pixel Vision Sensor (DAVIS) which uses the same photoreceptor for both the change detector and an Active Pixel Sensor (APS).

In the DAVIS camera each DAVIS pixel triggers on a luminance change asynchronously and will also with certain intervals synchronously take a full frame image. Apart from each DAVIS pixel being large, resulting in a low image resolution, the active synchronous sensor consumes a lot of power compared to the event-based sensor.

As indicated above, the event-based sensors may detect very rapid movements but have very low resolution since they have sparsely distributed pixels due to their complex and space demanding implementation. They are good at detecting movements but typically not that good to resolve the content of an image in any significant resolution and instead require post-processing in the application processor to create images that may be used to determine the content of a scene.

SUMMARY

An object of embodiments herein may be to obviate some of the problems mentioned above related to image sensors.

For example, the synchronous sensors are slow and power hungry, while the asynchronous sensors produce low-resolution images and/or are bulky. Combined sensors are very complex to produce and complex to operate and still usually do not provide high-resolution images due to size limitations.

The operation of combined sensors is usually both a power hungry and/or slow process. For example, for higher speed both the two sensor types may need to operate in parallel and transfer data to the application processor for analysis.

If only one sensor type is operational at a time and the other sensor should be activated based on triggering effects from the sensor being operational, this is a slow process due to the decoupled systems-data is transferred from one sensor (e.g., DVS) to the application processor, which analyzes the data in order to detect trigger conditions for the synchronous sensor which may lead to a control signal on an updated setting for the synchronous sensor to act in a certain way.

According to a first aspect, the object is achieved by a monolithic image sensor comprising 1) a pixel area sensitive to electromagnetic irradiation and comprising a first pixel area comprising an array of synchronous first image sensor pixels and further comprising a second pixel area comprising hybrid second image sensor pixels, 2) a change detector area comprising multiple asynchronous change detectors, and 3) a synchronous intensity read-out circuitry. A first photoreceptor of a respective first image sensor pixel is electrically coupled to the synchronous intensity read-out circuitry.

Further, a second photoreceptor of a respective hybrid second image sensor pixel is electrically coupled to the synchronous intensity read-out circuitry with a first connection and electrically coupled to a respective asynchronous change detector out of the multiple asynchronous change detectors with a second connection.

The change detector area is a distinct part of the image sensor which is separate from the pixel area.

According to a second aspect, the object is achieved by a camera module comprising the monolithic image sensor according to the first aspect.

According to a third aspect, the object is achieved by an electronic device comprising the camera module according to the second aspect.

According to a fourth aspect, the object is achieved by a method for operating a camera module according to the second aspect. The camera module comprises the monolithic image sensor according to the first aspect. The method comprises:

- determining, by a Digital Processing Unit, DPU, of the camera module, a setting of the image sensor based on output from the asynchronous change detectors comprised in the image sensor, and
- controlling the image sensor by implementing the setting.

According to a further aspect, the object is achieved by a computer program comprising instructions, which when executed by a camera module causes the camera module to perform actions according to the fourth aspect above.

According to a further aspect, the object is achieved by a carrier comprising the computer program of the further aspect above, wherein the carrier is one of an electronic signal, an optical signal, an electromagnetic signal, a magnetic signal, an electric signal, a radio signal, a microwave signal, or a computer-readable storage medium.

Since the change detector area is a distinct part of the image sensor which is separate from the pixel area the size of the hybrid second image sensor pixels is reduced, and the resolution of the second pixel area is increased such that the resolution of the asynchronous sensor is increased. Further, since the second photoreceptor of the respective hybrid second image sensor pixel is also electrically coupled to the synchronous intensity read-out circuitry with the first connection the second pixel area may also contribute to a high-resolution synchronous image frame.

Since the camera module comprises the DPU that determines the setting of the image sensor based on output from the asynchronous change detectors, and then implements the setting, the camera module decreases both time and power required to control the image sensor. For example, the synchronous part of the image sensor may be at least partially inactive or operate at a low frame rate until the output from the asynchronous change detectors triggers the camera module to activate the synchronous image sensor, e.g. based on a detected motion into the field of view based on the output from the asynchronous change detectors.

A further advantage of embodiments herein is that the second image sensor pixels of the second pixel area may have the same aperture ratio as the first image sensor pixels of the first pixel area if BackSide Illumination (BSI) technology is used where the electromagnetic radiation enters the sensor pixel without being obstructed by wiring since the wiring is arranged on the front side of the sensor die.

A further advantage of embodiments herein is that cost and complexity of the hybrid camera module comprising both synchronous and asynchronous sensors is reduced since the sensors are integrated in one monolithic sensor. A single sensor requires only a single lens system. Further, embodiments herein only require one interface to an application processor.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which.

DETAILED DESCRIPTION

Figure 1:
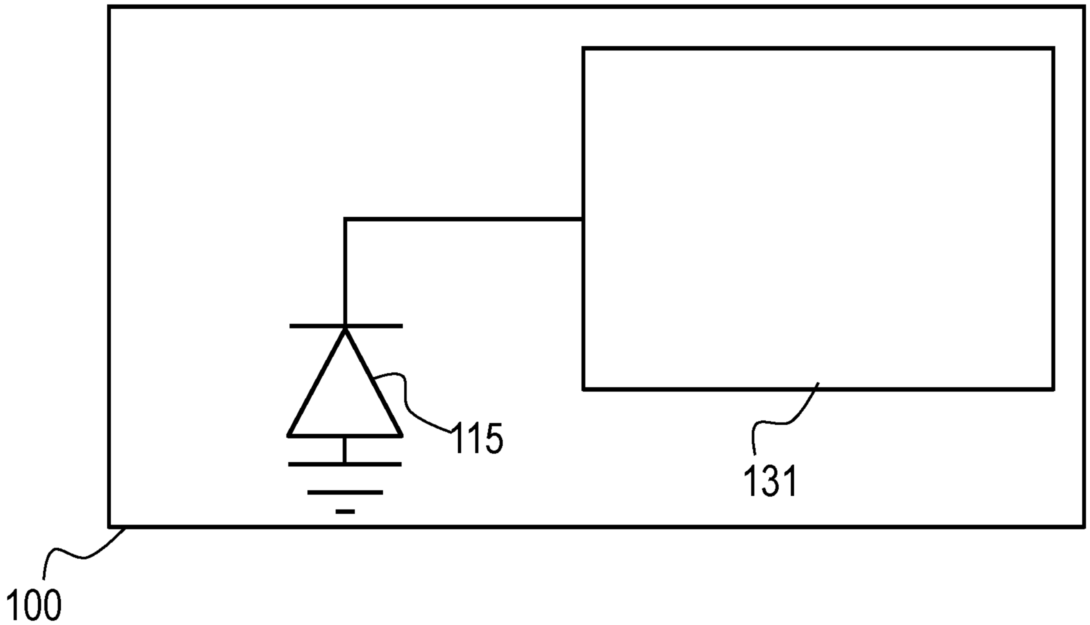
FIG. 1 illustrates an exemplifying embodiment of a prior art hybrid image sensor pixel, FIG. **2*a* illustrates exemplifying embodiments of a monolithic image sensor.

FIG. 1 schematically illustrates an example of a reference hybrid pixel 100.

The reference hybrid pixel 100 comprises a photoreceptor 115 and a change detector 131. The photoreceptor 115 may be electrically connected to an intensity readout circuit (not shown) and to the change detector 131. The intensity readout circuit may be part of an Active Pixel Sensor (APS).

The change detector 131 may be implemented in various known ways. For example, the change detector may comprise any one or more of a logarithmic photoreceptor circuit, a differencing circuit that amplifies changes with high precision, and two-transistor comparators. The photoreceptor circuit may be configured in a transimpedance configuration which converts the photocurrent logarithmically into a voltage and also holds the photodiode clamped at a virtual ground. The photoreceptor output may be buffered with a source follower to isolate the sensitive photoreceptor from the rapid transients in the differencing circuit. The source follower drives the capacitive input of the differencing circuit. Additionally, the photoreceptor circuit includes the option of adaptive biasing. A following capacitive-feedback inverting amplifier may be balanced with a reset switch that shorts its input and output together, resulting in a reset voltage level. The comparators compare the output of the inverting amplifier against global thresholds that are offset from the reset voltage to detect increasing and decreasing changes. If the input of a comparator overcomes its threshold, an ON or OFF event is generated.

Since the reference hybrid pixel 100 comprises the change detector 131 the reference hybrid pixel 100 is much larger than a pixel used solely for synchronous detection.

As mentioned above, in the DAVIS camera each DAVIS pixel triggers on a luminance change asynchronously and will also with certain intervals synchronously take a full frame image. Apart from each DAVIS pixel being large, resulting in a low image resolution, the active synchronous sensor consumes a lot of power compared to the event-based sensor.

As mentioned above, an object of embodiments herein is to provide an improved image sensor, for example improved over the DAVIS sensor and/or over a sensor comprising the hybrid pixel 100 illustrated in FIG. 1.

Embodiments herein provide for a unique monolithic integration of an asynchronous sensor with a synchronous sensor. The monolithic integration allows e.g., to share a lens system for both sensors.

The asynchronous sensor may have a lower resolution than the synchronous sensor. However, the asynchronous sensor may have a higher resolution than prior art asynchronous sensors since change detectors are arranged in a distinct part of the image sensor which is separate from a part of the image sensor which comprises the asynchronous pixels.

Also, the resolution and size of the synchronous sensor may be similar or same as for conventional synchronous sensors since photodetectors of the asynchronous sensor are also coupled to synchronous read-out circuitry and since the change detectors are arranged the distinct part of the image sensor which is separate from the asynchronous pixels.

Further, the asynchronous sensor may detect events which automatically triggers a camera module comprising the sensors to adapt settings of the camera module, e.g., settings of the sensors and/or to activate the synchronous sensor.

A further application is to use the asynchronous pixels to discriminate content or motion that has an amount of motion corresponding to a profile of what is being monitored such as moving humans, stationary equipment, weather phenomena and varying illumination of a scene e.g., night vision mode. With discriminating content is meant to discriminate for example moving objects of certain shape and/or size. However, also static objects may be discriminated, since these may be triggered due to a moving camera, or because of an illumination change. For example, it is possible to trigger the synchronous sensor if a human moves, while the synchronous sensor is not triggered if a dog moves. In another embodiment the synchronous sensor may be triggered if it is detected that an object is in motion, while the synchronous sensor is not triggered if the whole scene changes (probably indicating a moving camera and a static scene). For example, the event-based pixels may trigger on motion. Shape, size, direction and speed of moving object may be determined based on the speed of change of each independent pixel in a group of pixels with enough spatial resolution (e.g., in a 3×3 pattern around the boarder of the image sensor). Then it is possible to estimate the shape, speed and direction of something entering or exiting the field of view of the image sensor.

The profile mentioned above may be a database of shapes or a size or speed range. With embodiments herein it is possible to detect a square object and discriminate all objects that do not correspond to a profile corresponding to square objects (e.g., something round).

Thus, in embodiments herein any visual changes of the scene such as content and motion may trigger state changes of the change detectors. Scene changes may for example be caused by illumination changes, shadows, etc, which perhaps are not "relevant content". Such changes may be discriminated in favour of changes of the scene corresponding to a given profile, e.g., people-shaped objects.

Embodiments herein also provide for power savings as power to the synchronous sensor may be reduced.

Figure 2A:
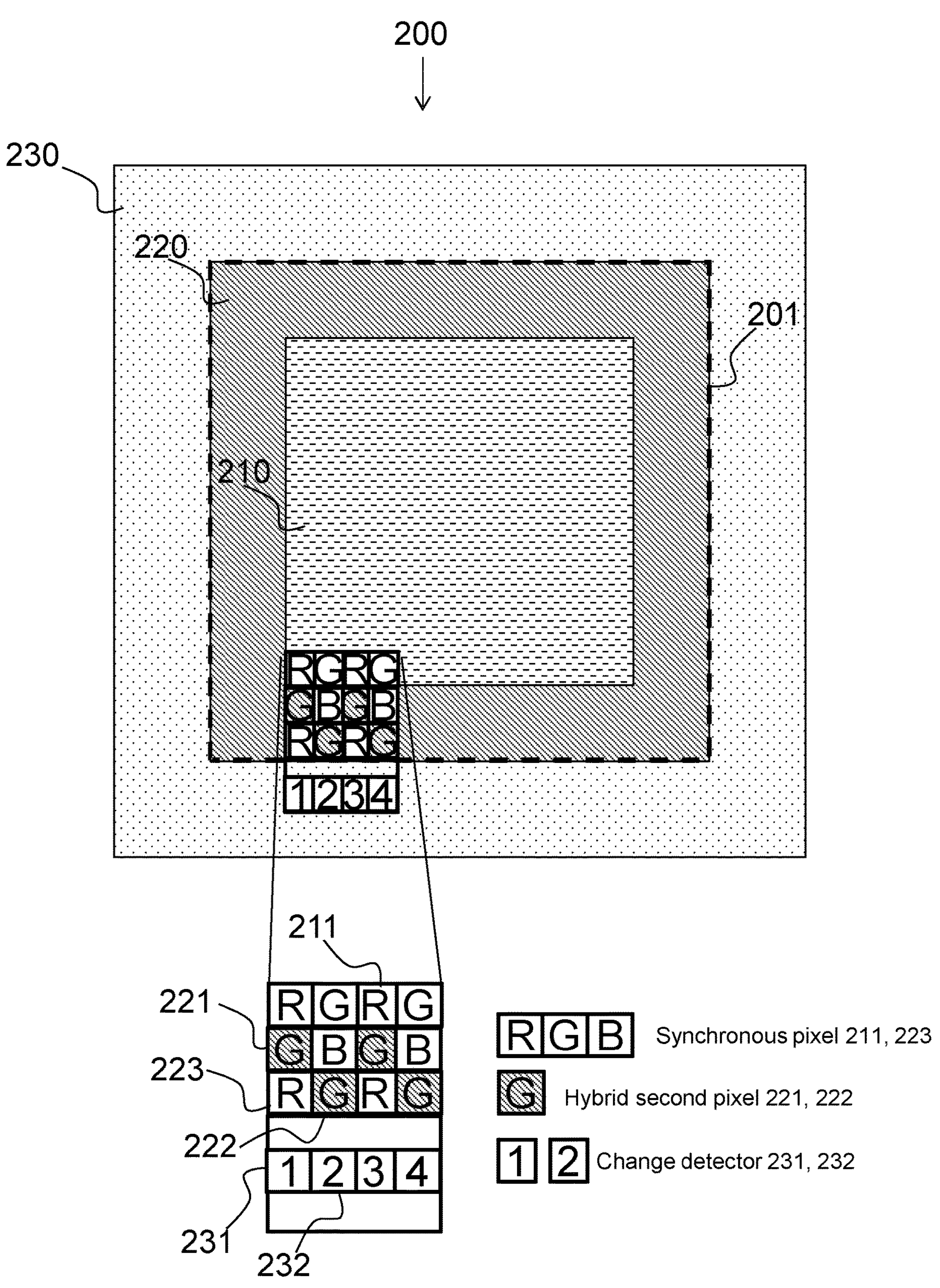
FIG. 2*b* illustrates further exemplifying embodiments of a monolithic image sensor.
FIG. 2*c* illustrates further exemplifying embodiments of a monolithic image sensor.
FIG. 2*d* illustrates exemplifying embodiments of a synchronous pixel of the monolithic image sensor.
FIG. 2*e* illustrates exemplifying embodiments of a hybrid pixel of the monolithic image sensor.

Embodiments herein will now be described with reference to FIG. 2*a*. FIG. 2*a* schematically depicts a monolithic image sensor 200. The image sensor 200 may be divided into different areas. In some embodiments, which will be described first, the different areas are arranged on a same plane of the image sensor 200, such as a same surface plane. In some other embodiments, which will be described later, the different areas may be arranged on different planes of the image sensor 200.

The image sensor 200 comprises a pixel area 201 illustrated in FIG. 2*a* as the total area within the hatched line. The pixel area 201 is sensitive to electromagnetic irradiation. The pixel area 201 may also be referred to as an imaging area of the image sensor 200 onto which a camera system may project an image of an object. FIG. 2*a* shows a surface of the image sensor 200 which is sensitive to the electromagnetic irradiation. The image sensor 200 may be sensitive to different electromagnetic wavelength ranges, such as Ultra Violet (UV) light, visible light and Infra-Red (IR) light.

The surface of the image sensor 200 may comprise the pixel area 201. When mounted in a camera module the surface may be arranged more or less perpendicular to the optical axis of the camera module.

The image sensor 200 may be made of semiconductor material, such as Si. Since the image sensor 200 is monolithic the image sensor 200 is made from a single die. More particularly the image sensor 200 may be a monolithic CMOS sensor. However, other technologies like CCD may also be used.

The pixel area 201 comprises a first pixel area 210 comprising an array of synchronous first image sensor pixels 211. The pixel area 201 further comprises a second pixel area 220 comprising hybrid second image sensor pixels 221, 222. In some embodiments herein the respective first and second pixel areas 210, 220 may comprise multiple pixel areas.

The second pixel area 220 may be a distinct part of the image sensor 200. Thus, the second pixel area 220 may be separate from the first pixel area 210. However, in some embodiments the two pixel areas 210, 220 may overlap.

In some embodiments herein the second pixel area 220 is arranged to at least partly surround the first pixel area 210. Then the first pixel area 210 may be arranged in the centre of the pixel area 201.

In some embodiments the second pixel area 220 is at least partly arranged in the centre of the pixel area 201.

The pixel area 201 may be of a rectangular shape. In particular, the first pixel area 210 and the second pixel area 220 may both be of rectangular shape or be built up by smaller sub areas which are of rectangular shape. However, other shapes of the pixel areas 210, 220 are also possible. In more detail the second pixel area 220 of FIG. 2*a* is illustrated as a frame of rectangular shape around the first pixel area 210, which is illustrated as a rectangle. The first pixel area 210 may be arranged centrally on the image sensor 200. The second pixel area 220 may be arranged concentrically around the first pixel area 210.

The array of synchronous first image sensor pixels 211 comprises multiple first image sensor pixels 211. The first image sensor pixels 211 may for example be arranged in rows and columns. Also the second image sensor pixels 221, 222 may be arranged in rows and columns.

In some embodiments a first pixel density of the first pixel area 210 equals a second pixel density of the second pixel area 220. In other words, the amount of pixels that fit in a specific area may be the same for the first and second pixel areas 210, 220. Thus, the pixel pitch may be the same for the first and second pixel areas 210, 220. As a result of arranging the pixels in the first and second pixel areas with the same density and/or the same pitch the resolution for the two pixel areas may be the same.

In some embodiments the size of the pixels may be the same.

However, the pixel density, pixel pitch and pixel size may also be different for the first and second pixel areas 210, 220.

The pixels 211, 221, 222 are the smallest addressable elements of the image sensor 200. Also the pixels are illustrated as rectangular. However, other shapes of the pixels are possible. The first pixel area 210 and the second pixel area 220 may be arranged on the same plane of the image sensor 200, e.g. on the same surface.

In order for the second image sensor pixels 221, 222 to contribute to the synchronous image a respective second image sensor pixel 221, 222 may be provided with a color filter.

In order to optimise sensitivity to visible light the respective second image sensor pixel 221, 222 may comprise a green color filter since pixels with a green color filter contribute with more luminance than pixels with red or blue color filters. In some other embodiments the sensitivity to the electromagnetic radiation to be detected may be increased by not arranging any color filter in or in front of the respective second image sensor pixel 221, 222. Thus, in some embodiments the respective second image sensor pixel 221, 222 does not comprise a color filter. If all or some of the second image sensor pixel 221, 222 correspond to green pixels with removed color filter a green value for those pixels may be calculated. The green value may for example be calculated by periodically capturing a full frame image from at least the first pixel area 210. The calculation may be performed in numerous ways and is commonly used in imaging as each pixel only has one color filter, and intensity values of the other two colors are calculated, e.g. by using known relations between sensitivity and wavelength.

In another embodiment the respective second image sensor pixel 221, 222 have another color filter characteristic such as red, blue or any other wavelength depending on the use of the second image sensor pixels 221, 222, to be able to detect a certain wavelength of the objects that are to be detected by the second image sensor pixels 221, 222.

In some embodiments the respective second image sensor pixel 221, 222 comprises two or more different color filters to be able to detect combinations of different wavelengths.

The image sensor 200 further comprises a synchronous intensity read-out circuitry 260. The synchronous intensity read-out circuitry 260 is configured for synchronous read-out of a pixel intensity. The synchronous intensity read-out circuitry 260 may be arranged outside the pixel area 201. In other words, the synchronous intensity read-out circuitry 260 may be arranged on a part of the image sensor 200 which is separate from the pixel area 201, e.g., which does not overlap the pixel area 201. The synchronous intensity read-out circuitry 260 may comprise multiple synchronous intensity read-out circuitries 260. Then a respective synchronous intensity read-out circuitry 260 may be arranged at the end of a column of pixels. In other embodiments a single synchronous intensity read-out circuitry 260 may be connected to multiple pixel columns via a multiplexer. In some embodiments herein the synchronous intensity read-out circuitry 260 comprises the multiplexer. In some further embodiments the synchronous intensity read-out circuitry 260 may also comprise an analog front-end and/or an analog-to-digital converter (ADC).

The image sensor 200 further comprises a change detector area 230 comprising multiple asynchronous change detectors 231, 232. The change detectors 231, 232 are electrically coupled to the hybrid second image sensor pixels 221, 222. For example, each change detector 231, 232 may be connected to a corresponding hybrid second image sensor pixels 221, 222. The change detector area 230 is distinct from the pixel area 201. That is, the change detector area 230 is a distinct part of the image sensor 200 which is separate from the pixel area 201. Thus, the change detector area 230 is separated from the hybrid second image sensor pixels 221, 222. In other words, the pixel area 201 does not comprise any change detectors 231, 232.

In embodiments herein when two areas are said to be separate that means that the two areas are not overlapping in the same plane. Thus, if the two separate areas are arranged on the same plane the areas are non-overlapping. If the two areas are arranged on different planes of the image sensor 200 then the two areas may be arranged above/below each other and still be separate.

In some embodiments the change detector area 230 is arranged outside the pixel area 201 of the image sensor 200. For example, the change detector area 230 may be arranged to at least partly surround the pixel area 201. In an example, illustrated in FIG. 2*a*, the change detector area 230 completely surrounds the pixel area 201. In another example the change detector area 230 is arranged to partly surround the pixel area 201, e.g., by being arranged in a U-shape around the pixel area 201.

In other words, the change detector area 230 may be arranged outside an active area, or in other words a light sensitive area, of the image sensor 200. For example, in some embodiments herein the change detector area 230 is arranged on the image sensor 200 such that no light from the scene hits the change detector area 230.

As mentioned above, FIG. 2*a* illustrates the second pixel area 220 as a frame around the first pixel area 210. This arrangement makes it possible to provide a high resolution first pixel area 210, i.e., it is possible to provide a high-resolution synchronous image frame from the first pixel area 210.

Figure 2B:
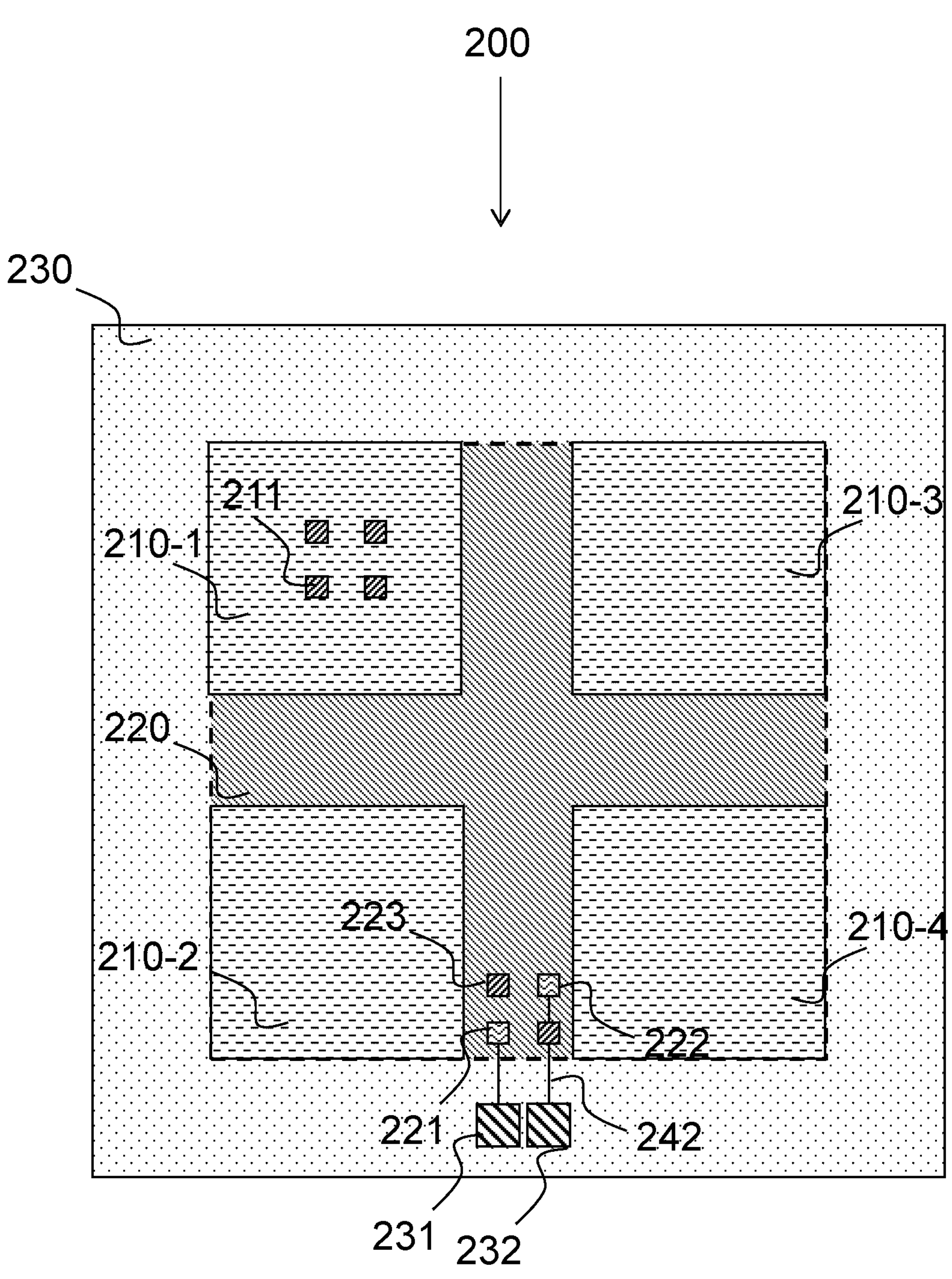

Other layouts or arrangements of the different areas of the image sensor are also possible and may depend on what the image sensor 200 will be used for. FIG. 2*b* illustrates another layout of the different areas, still arranged on the same plane of the image sensor 200. In FIG. 2*b* the second pixel area 220 is cross-shaped and arranged in the centre of the pixel area 201. In FIG. 2*b* the first pixel area 210 comprises four sub areas 210-1, 210-2, 210-3, 210-4. The sub areas 210-1, 210-2, 210-3, 210-4 are separated by the second pixel area 220. The change detector area 230 may be arranged in the same way as for the layout illustrated in FIG. 2*a*, e.g., around or partly around the pixel area 201.

Figure 2C:
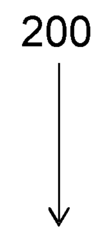
Figure 2C:
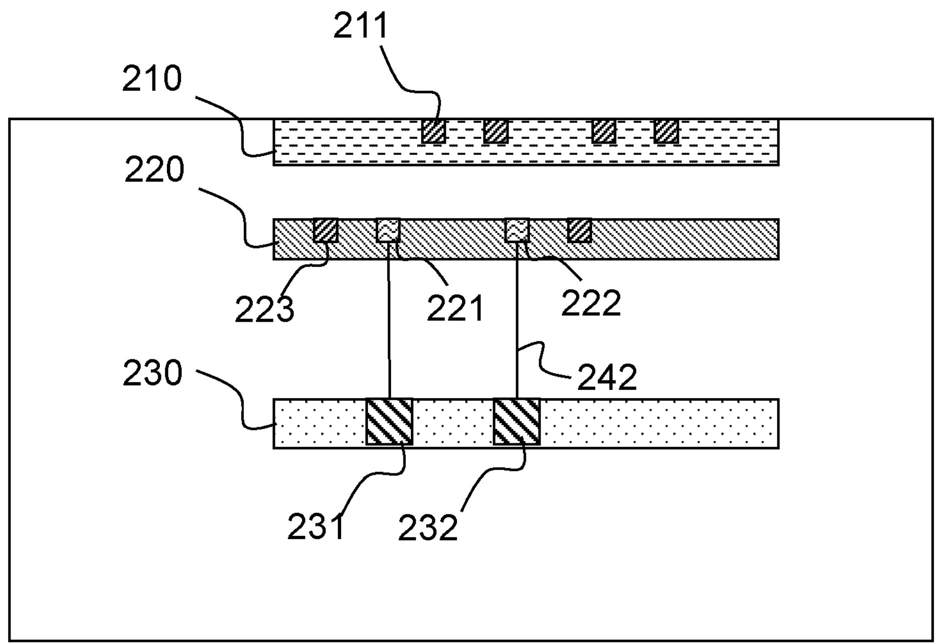

Some embodiments where the different areas of the image sensor 200 are arranged on different planes of the image sensor 200 will now be described with reference to FIG. 2*c*. FIG. 2*c* illustrates a cross-section of the image sensor 200. In FIG. 2*c* the first pixel area 210 is arranged on a first plane of the image sensor 200. In some embodiments the image sensor 200 is to be arranged in a camera module such that the first plane is arranged more or less perpendicular to the optical axis of the camera module. The first plane may be a backside surface of the image sensor die, e.g., if the image sensor uses or takes advantage of backside illumination (BSI) technology. In other embodiments the first plane may be a frontside surface of the image sensor die.

The second pixel area 220 may be arranged on a second plane of the image sensor 200. The second plane may for example be arranged beneath the first plane when viewed from the surface of the image sensor 200. The change detector area 230 may be arranged on a third plane of the image sensor 200, e.g., arranged beneath the second plane when viewed from the surface of the image sensor 200 or between the first plane and the second plane.

A combination of the different arrangements described above is also possible. For example, in some embodiments two of the three different areas of the image sensor 200 are arranged on a same plane of the image sensor 200 while one area is arranged on a different plane of the image sensor 200.

Figure 2D:
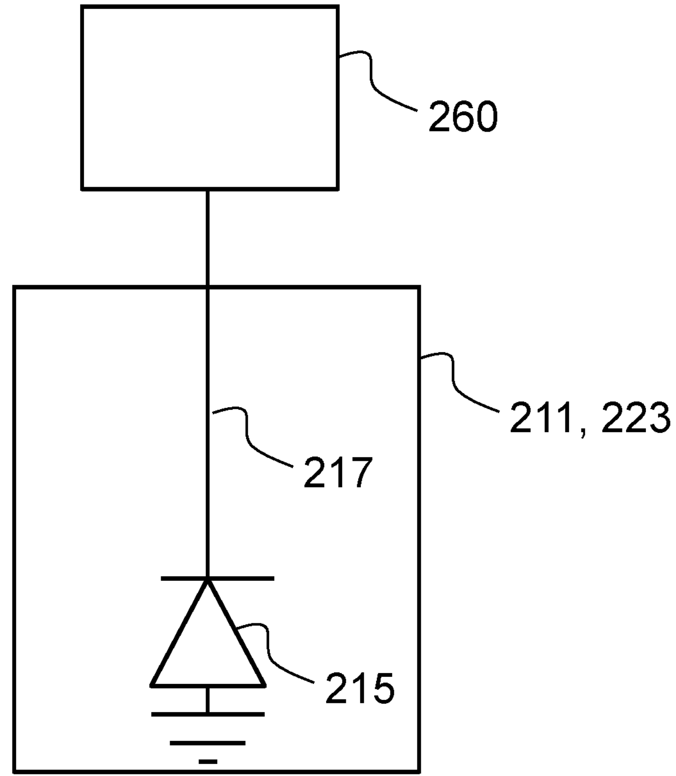

FIG. 2*d* schematically illustrates one of the synchronous first image sensor pixels 211 and an electrical connection 217 to the synchronous intensity read-out circuitry 260. Each first image sensor pixel 211 comprises a first photoreceptor 215. The first photoreceptor 215 of the respective first image sensor pixel 211 is electrically coupled to the synchronous intensity read-out circuitry 260. FIG. 2*d* illustrates the electrical connection 217 between the first photoreceptor 215 of the first image sensor pixel 211 and the synchronous intensity read-out circuitry 260.

Figure 2E:
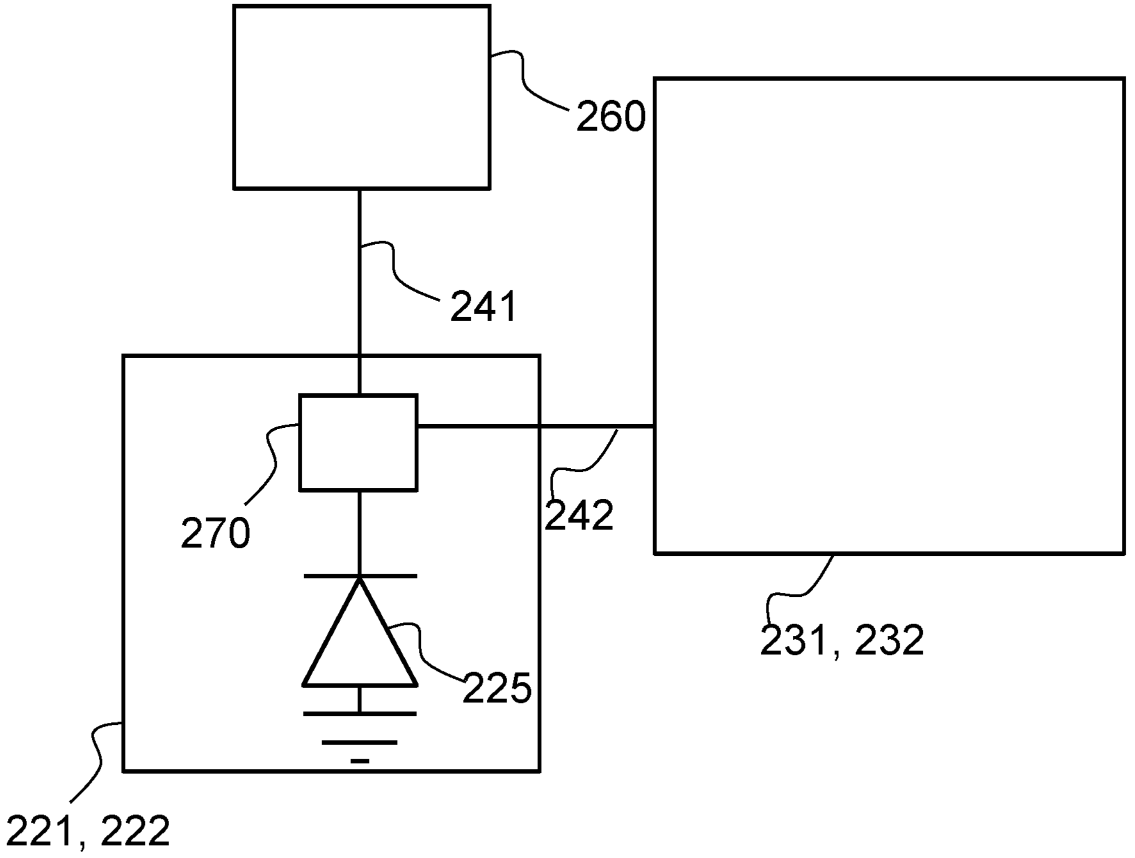

FIG. 2*e* schematically illustrates one of the hybrid second image sensor pixels 221, 222 and a first electrical connection 241 to the synchronous intensity read-out circuitry 260. Each second image sensor pixel 221, 222 comprises a photoreceptor which will be referred to as a second photoreceptor 225.

The second image sensor pixels 221, 222 may further comprise an electrical splitter 270 in order to connect the second photoreceptor 225 to both the synchronous intensity read-out circuitry 260 and the change detector 231, 232.

The second pixel area 220 may further comprise third image sensor pixels 223. FIG. 2*d* also schematically illustrates one of the third image sensor pixels 223. A third photoreceptor 215 of a respective third image sensor pixel 223 is electrically coupled to the synchronous intensity read-out circuitry 260 but not electrically coupled to the asynchronous change detectors 231, 232. The third image sensor pixels 223 may be of a same type as the first image sensor pixels 211 and/or of the same size.

In different embodiments the relative amount of third image sensor pixels 223 to second image sensor pixels 221, 222 may vary. However, the third image sensor pixels 223 may be arranged within the second pixel area 220 such that the overall pixel pitch in the second pixel area 220 is the same.

In some embodiments the second pixel area 220 comprises at least two rows and two columns of second image sensor pixels 221, 222. That is, the second image sensor pixels 221, 222 may be arranged in at least two rows or columns. The spatial resolution of the asynchronous event detection may be improved if the second image sensor pixels 221, 222 are arranged in at least two rows or columns compared to if the second image sensor pixels 221, 222 are arranged in a single row or column.

The rows or columns do not need to be adjacent to each other. In some embodiments there are several rows and/or columns of third image sensor pixels 223 in-between each second image sensor pixels 221, 222. Such an arrangement may provide a better angular resolution of an object captured by the image sensor 200.

Also the photoreceptors 225 of the second image sensor pixels 221, 222 may be of a same type as the photoreceptors 215 of the synchronous first image sensor pixels 211 and/or of a same type as the photoreceptor 215 of the third image sensor pixel 223.

In some embodiments the photoreceptors 225 of the second image sensor pixels 221, 222 may have a same size as the photoreceptors 215 of the synchronous first image sensor pixels 211 and/or the same size as the photoreceptor 215 of the third image sensor pixel 223.

The second photoreceptor 225 of the respective hybrid second image sensor pixel 221, 222 is electrically coupled to the synchronous intensity read-out circuitry 260 with the first connection 241 and electrically coupled to a respective asynchronous change detector 231, 232 out of the multiple asynchronous change detectors 231, 232 with a second connection 242.

FIG. 2*e* illustrates the first electrical connection 241 between the second photoreceptor 225 and the synchronous intensity read-out circuitry 260. FIG. 2*e* further illustrates the second electrical connection 242 between the second photoreceptor 225 and the asynchronous change detector 231.

The second image sensor pixels 221, 222 of the second pixel area 220 may be used together with the first image sensor pixels 211 to build a synchronous image from the pixel area 201.

In some embodiments herein the image sensor 200 is configured to operate the second image sensor pixels 221, 222 either in an asynchronous mode, in which the respective asynchronous change detector 231, 232 asynchronously outputs a signal if a significant change in illumination intensity of the corresponding photoreceptor 225 is detected, or in a synchronous mode, in which the synchronous intensity read-out circuitry 260 synchronously outputs a respective pixel value corresponding to a respective illumination intensity of the corresponding photoreceptor 225. Example embodiments of how the image sensor 200 may be operated will be described below.

Embodiments herein will now described with reference to FIG. 3*a* which illustrate a camera module 300 comprising the monolithic image sensor 200 described above.

The camera module 300 may comprise a Digital Processing Unit, DPU, 310 configured to determine a setting of the image sensor 200 based on output from the asynchronous change detectors 231, 232 comprised in the image sensor 200, and control the image sensor 200 by implementing the setting.

In some embodiments the DPU 310 and the monolithic image sensor 200 are monolithically integrated. That is, the DPU 310 and the monolithic image sensor 200 may be arranged on the same die.

As mentioned above, the monolithic image sensor 200 comprises the multiple asynchronous change detectors 231, 232. Thus, the camera module 300 also comprises the multiple asynchronous change detectors 231, 232. In FIG. 3*a*, the multiple asynchronous change detectors 231, 232 have been depicted as a separate part of the camera module 300, although they in fact are integrated with the image sensor 200, in order to better understand the different flows of data and control signals within the camera module 300.

The camera module 300 may further comprise a sensor control 330, a multiplexer 340, an analog front end 350, an ADC 360, an interface (IF) 370 to a host device 390.

As mentioned above, the synchronous intensity read-out circuitry 260 may comprise the multiplexer 340. In some further embodiments the synchronous intensity read-out circuitry 260 may also comprise the analog front-end 350 and/or the ADC 360.

The host device 390 may for example be an application host such as an image processor in a camera or in a mobile phone.

Figure 3A:
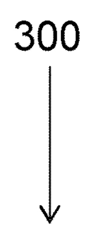
FIG. 3*a* illustrates exemplifying embodiments of a camera module comprising a monolithic image sensor.
Figure 3A:
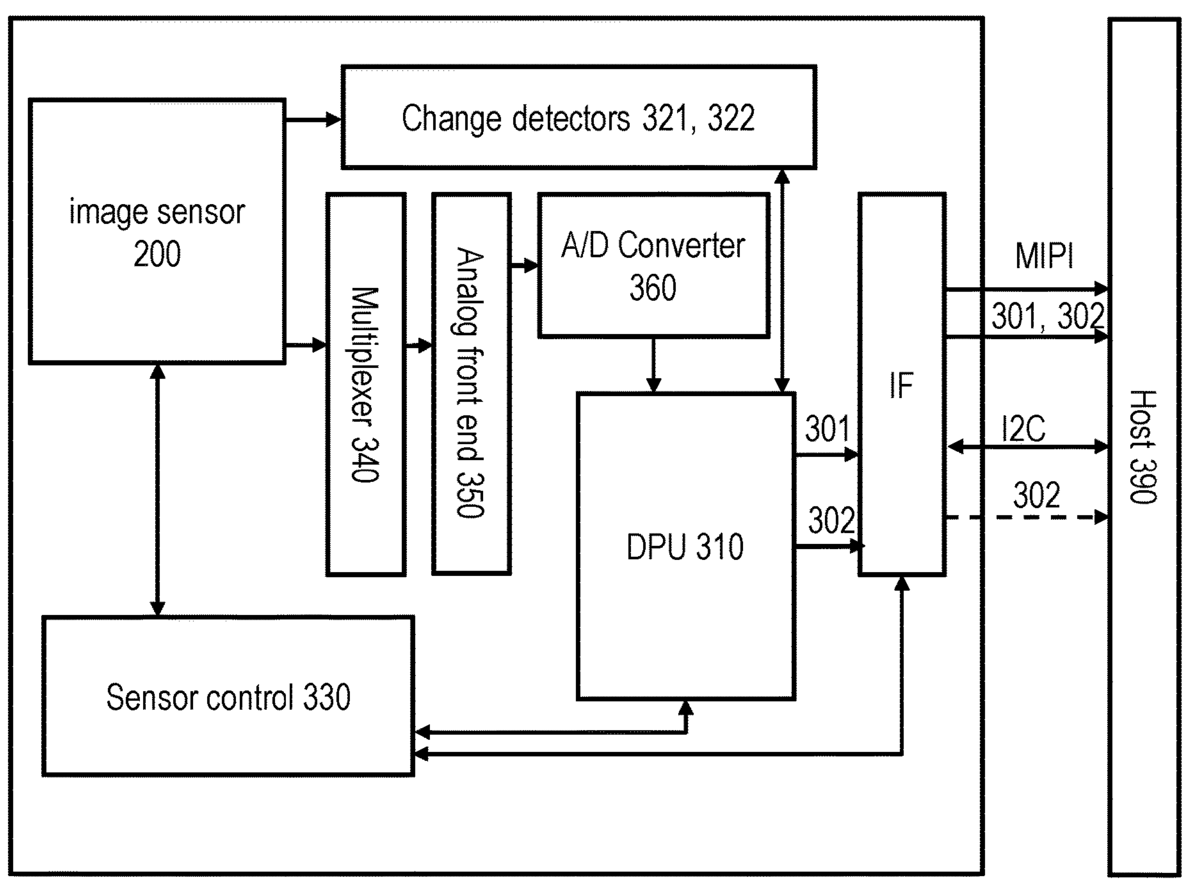

The arrows in FIG. 3*a* indicate data or communication flow. For example, the change detectors 231, 232 may receive pixel signals or pixel data from the image sensor 200, i.e., from the hybrid second image sensor pixels 221, 222. The DPU 310 may collect data from the change detectors 231, 232. For example, the DPU 310 may query the change detector 231, 232 for the data. The DPU 310 may also control the change detectors 231, 232 with control signals.

The DPU 310 also receives image data from the image sensor 200, e.g., high-resolution image frames, based on the output from the synchronous read-out circuitry 260. The data from the image sensor 200 may pass through the multiplexer 340, the analog front end 350, and the A/D converter 360 before being processed by the DPU 310.

The DPU 310 may further communicate with the sensor control 330 which may implement settings of the image sensor 200 which are determined or selected by the DPU 310. The sensor control 330 may be implemented by a register.

The sensor control 330 may further communicate with the image sensor 200, for example to implement the settings of the image sensor 200.

The DPU 310 may further communicate with the host device 390 through the IF 370. The DPU 310 may for example communicate both data 301 and triggering signals 302 with the host device 390. Communication between the IF 370 and the host device 390 may be performed over a high speed interface and/or a low speed interface. The high-speed interface may for example be a Mobile Industry Processor Interface (MIPI) such as a MIPI Camera Serial Interface (CSI). Example of other high-speed interfaces are Low-Voltage Differential Signaling (LVDS), enhanced LVDS (eLVDS), etc. The low-speed interface may for example be an Inter-Integrated Circuit (I2C) interface, Serial Peripheral Interface (SPI), Serial Camera Control Bus (SCCB) etc. Both data 301 and triggering signals 302 may be sent from the camera module 300 to the host device 390 on the high-speed interface. Triggering signals 302 may also be sent on the low-speed interface. If the triggering signals are sent on the high-speed interface then they need not be sent on the low-speed interface, which is why the arrow below the I2C-arrow is illustrated with a hatched line. Data 301 corresponding to synchronous image data, e.g. high-resolution images may be sent on the high-speed interface, while data 301 corresponding to asynchronous image data from the change detectors 231, 232 may be sent on the high-speed interface and also on the low-speed interface if the data rate is low enough.

The triggering signals 302 may also be communicated to the host 390 on a separate line.

The sensor control 330 may also communicate with the host device 390 through the IF 370. For example, the sensor control 330 may receive settings of the image sensor 200 which are determined or selected by the host device 390.

The DPU 310 may handle all digital data for the image sensor 200. The DPU 310 may start by collecting data from the change detectors 231, 232. Data may be passed through to the host 390 and/or processed inside the camera module 300. For example, data may be processed inside the camera module 300 to detect objects that pass into the field of view of the camera module 300.

In some embodiments the camera module 300 is configured to determine a characteristic of an object captured by the image sensor 200 based on the output from the asynchronous change detectors 231, 232, and then determine the setting of the image sensor 200 based on the characteristic.

The characteristic of the object may also be referred to as a change detector pattern.

For example the DPU 310 may detect a certain movement based on a calculation of a velocity, shape, size or position of the object. There may be trigger conditions associated with each characteristic, such as a velocity threshold. If the trigger condition is met, then the DPU 310 may trigger a certain action in response thereto. For example, the DPU 310 may prepare the camera module 300 to capture the object in high-resolution, that is with a synchronous high-resolution image captured by at least the first image sensor pixels 211 and possibly also by the second image sensor pixels 221, 22 and/or third image sensor pixels 223.

Examples of sensor settings that may be set are:

1. Power settings, such as on/off or low-power and high-power mode. The power settings may be applied to the first pixel area 210 and/or the second pixel area 220.
2. Exposure, e.g., to accommodate the speed of the object
3. White balance, e.g, to change color setting to optimize the captured image for later processing at the host 390
4. Focus, e.g., to make sure that the object is in focus, in case of an auto focus camera module. In this case the driver of the auto-focus may be part of the camera module 300. For example, the driver of the auto-focus may be arranged on a same PCB on which the camera module 300 is arranged. By employing embodiments herein the focus may be controlled by the camera module 300 instead of by the host.

5. Resolution, e.g., to optimize the captured image for later processing at the host 390.

There are several different ways to specify the change detection pattern. In one example, the DPU 310 of the camera module 300 reacts on detected movements at any second image sensor pixel 221, 222 and then monitors for further changes on the same and neighboring pixels. By monitoring more than one change, the DPU 310 may filter out individual transients. The DPU 310 may be set to trigger activation of the high-resolution image sensor 200 according to a few different schemes, all controlled by the DPU 310 and settings of the camera module 300, for example settings of the image sensor 200. This mechanism exploits the fact that the second image sensor pixel 221, 222 have a much higher activation rate than the fastest frame rate of the image sensor 200 in the high-resolution synchronous mode. For example:

By detecting multiple events with the change detectors 231, 232. For example, if a consistent change of multiple activations of the change detectors 231, 232 occurs, a series of high-resolution sensor frames may be captured. It may be sufficient that there is a consistent activation across neighboring second image sensor pixels 221, 222, e.g., first an outer second pixel 221 followed by a neighboring inner second pixel 222. The consistent change of multiple activations may correspond to a situation where many change detectors 231, 232 are being triggered constantly. E.g., the camera module 300 itself is on the move, which may mean that the user intends to capture a video sequence. As opposed to a situation where just a few change detectors 231, 232 were activated on an upper-left corner of the pixel area 201, which may mean that the user wants to take a single shot to see what happened. The settings of the camera module 300 may dictate whether a single camera shot shall be captured or a video sequence.

By estimating a speed at which the second image sensor pixels 221, 222 trigger changes. This may be done by measuring a difference time between the triggered signal changes of the change detectors 231, 232 and relating the time difference to the distance between the second image sensor pixels 221, 222 that gave rise to the signal changes.

By estimating a future position of the object. For example, in case of automatic single shot setting, the DPU 310 may calculate when the moving object will reach a position in the image frame which maximizes its visibility in the field-of-view (FOV). Then the DPU 310 may trigger the sensor control 330 to capture a high-resolution image in the synchronous operating mode at the calculated time. This may be done as follows:

If the change detectors 231, 232 continuously trigger on movements at the object's entry-point into the FOV, without interruption, the high-resolution image capture may occur when the initial part of the object is estimated to have reached for example 80% into the FOV.

If the change detectors 231, 232 indicate that the movements at the entry point stops before the above position, the high-resolution image frame is triggered when the object is calculated to be in the middle of the FOV.

If, because of miscalculation of speed, further change detectors 231, 232 connected to further hybrid second image sensor pixels 221, 222 indicate an outgoing movement (light intensity of inner second pixel is changed before light intensity of an outer second pixel is changed), the camera module 300 may immediately capture a high-resolution image.

The above embodiments may be combined. Further optimizations are possible, e.g., enabling capturing of cropped high-resolution image fames if it is estimated that the object is only visible at a certain subset of the pixel area 201 of the image sensor 200.

One important aspect of embodiments herein is that data from the change detectors 231, 232 do not need to travel to the host 390 and then back to be able to set the parameters for the high-resolution sensor, e.g., for the first pixel area 210 and possibly for the second pixel area 220. This means that there will be very low latency from object detection to a sensor ready to capture a high-resolution image of that object. This is not possible if the change detectors need to wake up the host 390, that needs to process the information and then send parameter settings to the high-resolution sensor. Thus, it is an advantage that the camera module 300 according to embodiments herein may work stand alone in a really low-power mode without any interaction with the host 390.

As mentioned above, the image sensor 200 may be configured to operate the second image sensor pixels 221, 222 either in an asynchronous mode or in a synchronous mode. Also the camera module may be configured to operate in an asynchronous operating mode or a synchronous operating mode. In the asynchronous operating mode the camera module 300 reads output from the change detectors 231, 232. In the synchronous operating mode the camera module 300 reads output from the synchronous intensity read-out circuitry 260. Further, the camera module 300 may be configured to change operating mode from the asynchronous operating mode to the synchronous operating mode and back again. More particularly, the camera module 300 may be configured to change operating mode from the asynchronous operating mode to the synchronous operating mod based on the output from the change detectors 231, 232. Thus, the camera module 300 may be configured to operate the camera module 300 in the asynchronous operating mode in which the camera module 300 reads output from the change detectors 231, 232, and control the image sensor 200 by implementing the setting by being configured to change operating mode from the asynchronous operating mode to the synchronous operating mode, in which the camera module 300 reads output from the synchronous intensity read-out circuitry 260, based on the output from the change detectors 231, 232.

In some other embodiments the camera module 300 is further configured to capture, in the synchronous operating mode, a synchronous image frame based on the output from the synchronous intensity read-out circuitry 260, transmit the image to the host device 390 and/or discard the image, and change operating mode from the synchronous operating mode to the asynchronous operating mode in response to transmitting or discarding the image.

In some embodiments the output from the asynchronous change detectors 231, 232 comprises a first output associated with a first hybrid pixel 221 followed by a second output from a neighbouring hybrid pixel 222. Then the camera module 300 may be further configured to capture multiple synchronous image frames with the synchronous intensity read-out circuitry 260 in response to detecting the output from the asynchronous change detectors 231, 232.

Figure 3B:
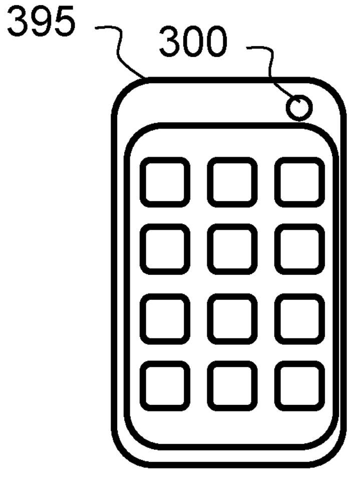
FIG. 3*b* illustrates exemplifying embodiments of an electronic device comprising a camera module.

Embodiments herein are also directed to an electronic device 395, schematically illustrated in FIG. 3*b*, comprising the camera module 300 described above. The electronic device 395 may for example be a consumer electronic device such as a mobile phone, a camera, a video camera, electronic eyewear, electronic clothing, and a smart watch. The electronic device 395 may also be a surveillance camera and a vehicle, such as a drone or a car. In some embodiments the electronic device 395 is a display or a smart wall.

Figure 4:
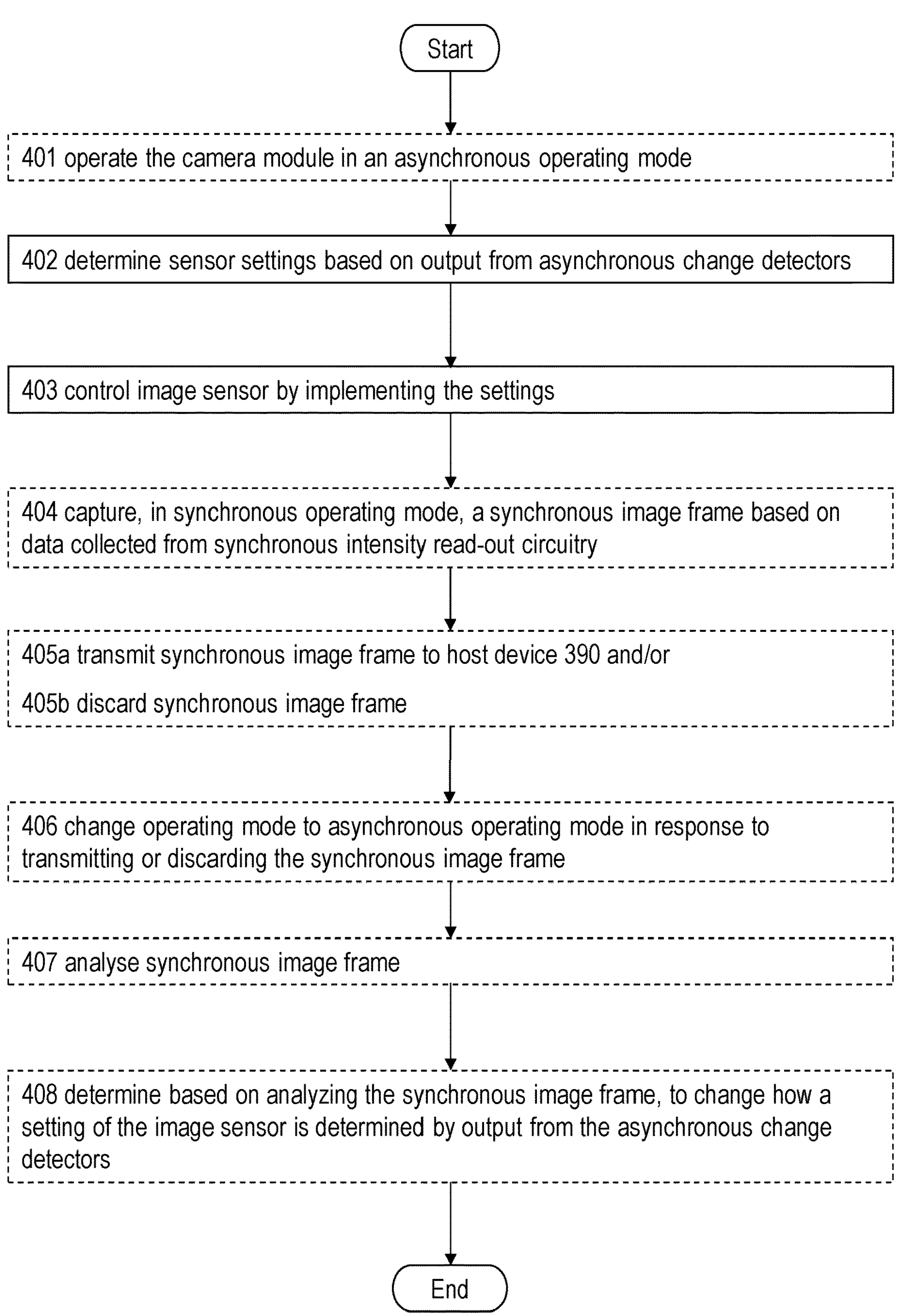
FIG. 4 is a flowchart illustrating embodiments of a method of operating a camera module.

Embodiments for operating the camera module 300 will now be described with reference to FIG. 4 which is a flow chart. The method may be performed by the camera module 300.

As mentioned above, the camera module 300 comprises the monolithic image sensor 200.

Action 401

The camera module 300 may operate or be operated in an asynchronous operating mode in which the camera module 300 reads output from the change detectors 231, 232.

Action 402

The DPU 310 of the camera module 300 may determine a setting of the image sensor 200 based on output from the asynchronous change detectors 231, 232 comprised in the image sensor 200.

Determining the setting may comprise determining one or more of: a power setting, an exposure setting, a white balance setting, a focus setting, a resolution setting, an image size setting, and a frame rate.

Examples of power settings is an on/off setting or low-power and high-power setting. In a low-power mode the image sensor 200 may be operated in the asynchronous mode while in the high-power mode the image sensor 200 may be operated in the synchronous mode in which high-resolution images may be captured.

For example, the DPU 310 may determine to activate the synchronous mode of the image sensor 200. The power settings may be applied to the first pixel area 210 and/or the second pixel area 220.

Further, in some embodiments the DPU 310 determines a characteristic of an object captured by the image sensor 200 based on the output from the asynchronous change detectors 231, 232 and then determines the setting of the image sensor 200 based on the characteristic. The characteristic may be one or more of a movement of the object, direction of the movement, velocity of the object, size of the object, and shape of the object.

Action 403

The camera module 300 may control the image sensor 200 by implementing the setting.

In some embodiments controlling the image sensor 200 by implementing the setting comprises changing operating mode from the asynchronous operating mode to the synchronous operating mode in which the camera module 300 reads output from the synchronous intensity read-out circuitry. Changing operating mode is then based on the output from the change detectors 231, 232. For example, based on the output from the change detectors 231, 232 the DPU 310 may detect a specific movement which triggers further analysis of the movement or of an image of the object that performs the movement. The DPU 310 may determine that the speed of the object is above a speed threshold and determines to change operating mode based on the speed fulfilling this trigger criterion. The DPU 310 may set settings of the image sensor 200 to capture the object in an optimised way.

Action 404

The camera module 300 may capture, in the synchronous operating mode, a synchronous image frame based on the output from the synchronous intensity read-out circuitry 260.

In some embodiments the output from the asynchronous change detectors 231, 232 comprises a first output associated with a first hybrid pixel 221 followed by a second output from a neighbouring hybrid pixel 222. Then the method may further comprise capturing multiple synchronous image frames with the synchronous intensity read-out circuitry 260 in response to detecting the output from the asynchronous change detectors 231, 232.

For example, if multiple change detectors 231, 232 each produces a respective output indicating a change in illumination of the respective hybrid second pixel 221, 222 over some predetermined time, for example consistent over the predetermined time, then a series of high-resolution sensor frames may be captured. It may be sufficient that there is a consistent activation across neighboring second image sensor pixels 221, 222, e.g., first an outer second pixel 221 followed by a neighboring inner second pixel 222. For example, if a lot of changes occur in a scene, then that may indicate that the user wants to record a video, since there may be a lot of interesting things happening. In another example, if a lot of changes occur in the scene, then that may indicate that the user wants to ignore it, because the user is not interested in detecting changes when the camera is moving, only when the camera is static and something fitting a certain profile happens.

Action 405

In some embodiments the host device 390 is interrupted to query if it is interested of the object being captured by the image sensor 200 based on e.g., speed vector, size and shape of the object. The camera module 300 may also take a high-resolution image of the object and store it internally before asking the host device 390. This may depend on what power and/or latency requirement a specific use case or application has. For example, this may depend on where and for what the camera module 300 is being used for. If the camera module 300 is comprised in a device connected to wall-power, then power requirements may not be important, but if the camera module 300 is comprised in a small battery-powered device, power requirements may be important. If the camera module 300 is comprised in a security camera, latency requirements may be relaxed, but if the camera module 300 is used for real-time sports-performance analysis, then latency requirements may be stricter compared to when the camera module 300 is comprised in a security camera.

The host device 390 may then decide if it requires an image or several images of the object or not. If the host device 390 requires the images, they may be sent over a high-speed interface such as the MIPI CSI.

If the camera module 300 already has stored the high-resolution image and the host device 390 doesn't require the image, then the camera module 300 may discard the image.

Once the image is sent or discarded the image sensor 200 and/or the camera module 300 may be put into change detector mode again, i.e., into the asynchronous mode. Thus, the camera module 300 may transmit the synchronous image frame to the host device 390 and/or discard the synchronous image frame.

Action 406

The camera module 300 may change operating mode from the synchronous operating mode to the asynchronous operating mode in response to transmitting or discarding the synchronous image frame.

Action 407

The camera module 300 may analyse the synchronous image frame. For example, in some embodiments, the captured high-resolution images as well as any captured high-resolution video stream may be analyzed by for example object detection algorithms in order to identify the moving object, its position and speed, and automatically adjust the settings of the camera module 300, in particular the settings of the image sensor 200. For example, if it is recognized that the estimated velocity or direction of the moving objects, such as object, is often significantly wrong, trigger points for when to capture high-resolution images, the frame rate of the video capture, or how aggressively to crop the high-resolution images may be adjusted.

Such algorithms may be executed by the camera module 300 and/or in the application processor of the host device 390 that receives the high-resolution image stream from the camera module 300. In other embodiments, such algorithms may be executed at a cloud service, which may receive the captured high-resolution images and videos for analysis. The analysis may then trigger a change of the settings of the camera module 300, more specifically of the settings of the image sensor 200.

Action 408

In some embodiments the camera module 300 determines, based on analysing the synchronous image frame, to change how the setting of the image sensor 200 is determined by the output from the asynchronous change detectors 231, 232.

Further embodiments for operating the camera module 300 will now be described with reference to FIG. 5*a*, which is a flow chart. The method may be performed by the camera module 300. The method may be performed without interrupting the host device 390. However, some of the described actions involve an interaction with the host device 390.

Action 501

Figure 5A:
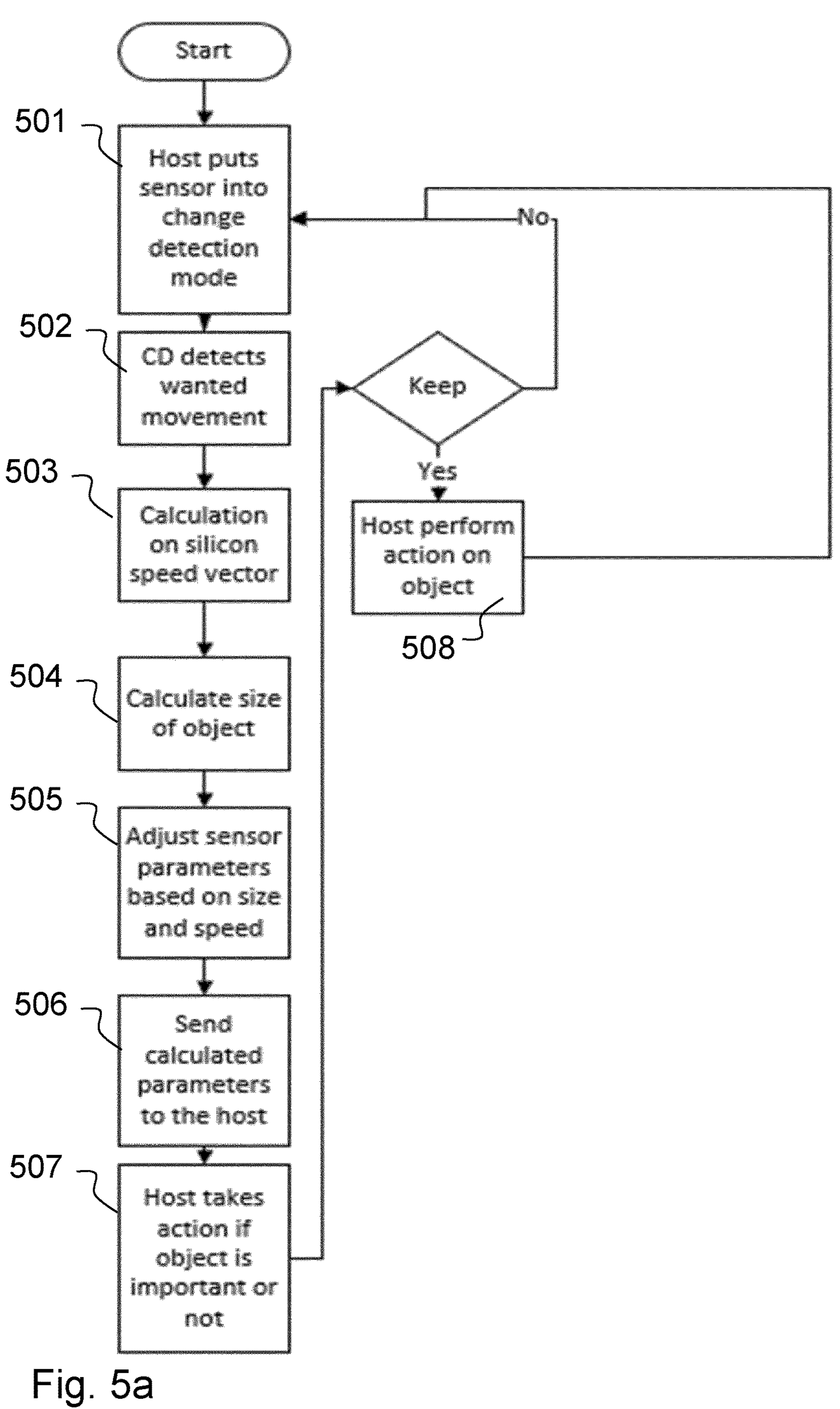
FIG. 5*a* illustrates exemplifying embodiments of a method of operating a camera module.
Figure 5:
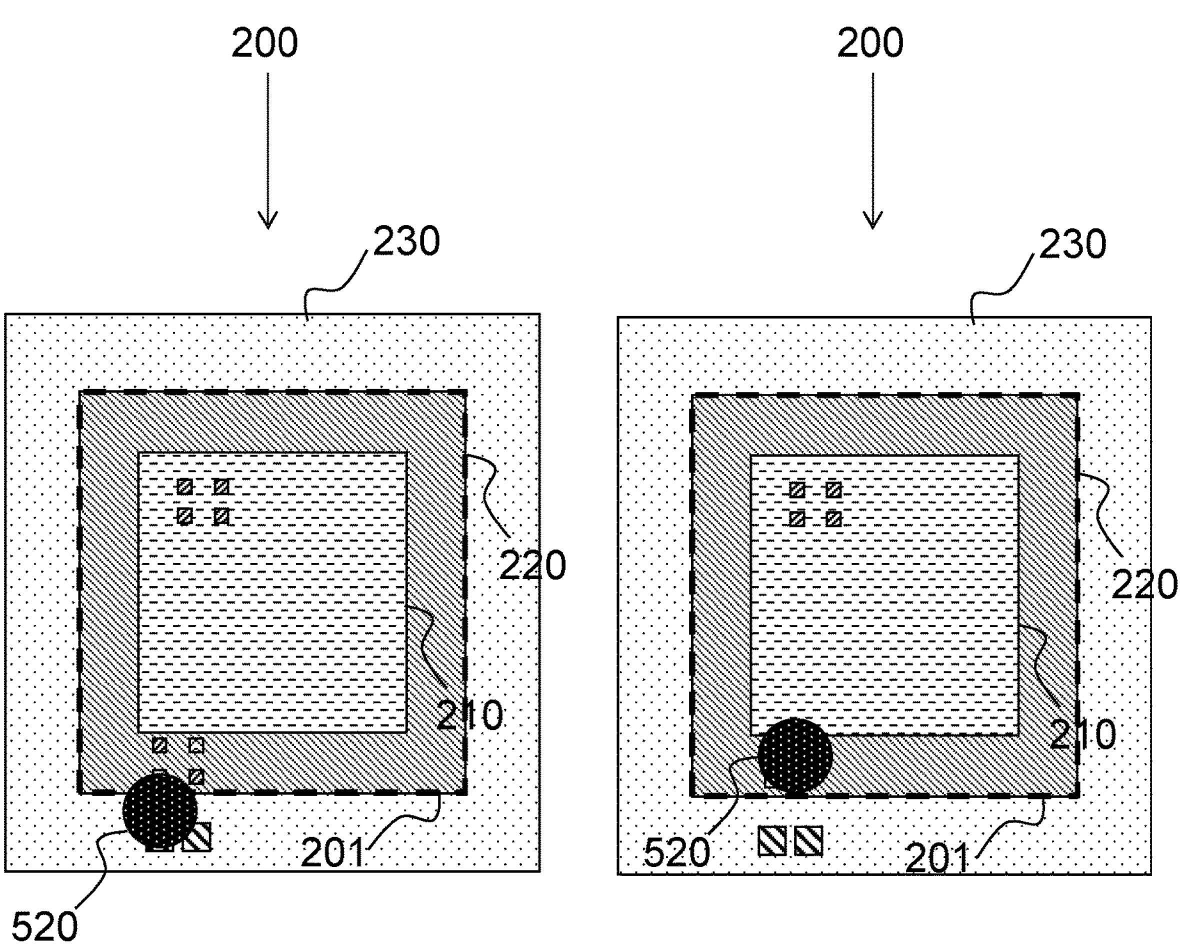
FIG. 5*b* illustrates a monolithic image sensor and further exemplifying embodiments of a method of operating a camera module.
FIG. 5*c* illustrates a monolithic image sensor and further exemplifying embodiments of a method of operating a camera module.

The method illustrated in FIG. 5*a* starts with the host device 390 putting the image sensor 200 into change detector mode. The change detector mode corresponds to the asynchronous mode mentioned above. This means that the image sensor 200 may start to monitor the photoreceptors 225 that are connected to the change detectors 231. For example, the image sensor 200 may start to monitor all the photoreceptors 225 that are connected to the change detectors 231.

Action 502

Once a luminance change is detected by the change detector(s) 231, 232 the data from the change detectors 231, 232 will be processed by the internal DPU 310 of the camera module 300.

Action 503

A first value that may be calculated is a speed vector of an object 520 entering the field of view of the image sensor 200 as illustrated in Error! Reference source not found.b and 5*c*. The speed may be calculated as a speed of the image of the object 520 on the image sensor 200. Such a calculation is possible since the second image sensor pixels 221, 222 have a certain spatial (or angular) resolution.

Action 504

Once the speed vector of the object 520 has been calculated a next possible calculation is to determine a size and/or shape of the object 520. Since the second image sensor pixels 221, 222 are spatially distributed with some distance between them the size and the shape of the object 520 may be determined by the DPU 310 as the object 520 moves over the second image sensor pixels 221, 222.

Action 505

The DPU 310 may set settings or parameters related to the high-resolution mode (synchronous mode) of the image sensor 200 based on the calculated speed vector of the object 520. Thus, the settings of the synchronous operating mode of the image sensor 200 may be adapted for the calculated speed vector.

The DPU 310 may further set settings or parameters related to the high-resolution mode (synchronous mode) of the image sensor 200 based on the calculated size and/or shape of the object 520.

For example, the DPU 310 may adjust a size and a resolution of the image sensor 200 in the high-resolution mode to accommodate the size and shape of the object. The size of the image sensor 200 in the high-resolution mode may be set by selecting which parts of the pixel area 201 that will be active in the high-resolution mode.

In some embodiments herein the DPU 310 determines which image sensor pixels of the first pixel area 210 and which image sensor pixels of the second pixel area 220 that are to be active for a high-resolution image.

In some embodiments the DPU 310 determines which part of the image sensor 200, e.g., which pixel area 210, 220 that is to be active for the high-resolution image. Then all pixels within that pixel area will be active.

For example, the DPU 310 may select all the first image sensor pixels 211 of the first pixel area 210 and/or the second image sensor pixels 221, 222 of the second pixel area 220 to be active for the high-resolution image of the object 520. In another example, the object 520 moves at high speed while a required resolution is low. Then the DPU 310 may select some of the first image sensor pixels 211 of the first pixel area 210 and/or some of the second image sensor pixels 221, 222 of the second pixel area 220. For example, the DPU 310 may select every other first image sensor pixels 211 of the first pixel area 210 to be active for the high-resolution image. Since the object 520 moves at high speed a high frame rate for the high-resolution image may be selected.

In another example, a larger object triggers the DPU 310 to activate a larger pixel area than a smaller object does. In a yet further example, the larger object triggers the DPU 310 to activate fewer pixels which are more spaced apart than the pixels activated by the smaller object.

Once the parameters are set an image of the object 520 may be captured.

Action 506

As mentioned above, in some embodiments the host device 390 is interrupted to query if it is interested of the object being captured by the image sensor 200 based on e.g., speed vector, size and shape of the object. The camera module 300 may also take a high-resolution image of the object 520 and store it internally before asking the host device 390. This may depend on what power and/or latency requirement a specific application has.

Action 507

The host device 390 may then decide, e.g., based on for example the speed vector, size and shape of the object, if it requires an image or several images of the object or not. If the host device 390 requires the image, the image may be sent over the high-speed interface.

If the camera module 300 already has stored the high-resolution image and the host device 390 doesn't require the image, then the camera module 300 may discard the image.

Once the image is sent or discarded the image sensor 200 and/or the camera module 300 may be put into change detector mode again, i.e., into the asynchronous mode.

There may be several different criteria used to determine whether or not the object 520 is important. Important may e.g., mean that the object 520 should trigger an activation of the synchronous operating mode in which high-resolution image frames are captured.

In an example, it may be sufficient that there is a consistent activation across neighboring second pixels 221, 222 as described above.

In another example, it may be required that the object 520 is detected by the change detectors over more than one pixel width, meaning for example that within some maximum time-difference a change of illumination is detected from two side-positioned outer second pixels 221, 222 followed by a change of illumination from two neighboring inner second pixels 221, 222.

In yet another example, the shape of the object 520 impacts the triggering of the synchronous mode. Detection of signal changes from the hybrid second image sensor pixels 221, 222 is extremely fast, which allows estimation of the shape by analyzing e.g., time, space and signal intensity relationships between the generated change detector signals from different second pixels 221, 222. For example, the spatial relation between the second pixels 221, 222 which generate the change detector signals may be used to estimate the shape, size, and speed of the object 520. If the hybrid second image sensor pixels 221, 222 comprise optical filters, such as a color filter, then color, color change and polarization may also be estimated in the same way.

For example, round or oval shapes may be detected by detecting a change event from an initial entry pixel followed by respective change events from additional pixels in both directions (right-left or up-down of the initial pixel) in a non-equidistant speed. This may be distinguished from a straight object that may have a different pattern of pixel changes, i.e. a different pixel pattern of the change detector events.

In yet another example, the DPU 310 is set to trigger on objects entering into the scene but not to trigger on movements of the camera module 300 itself for which the whole scene is moving in a consistent way. This may be detected by the fact that all the hybrid second pixels 221, 222 may generate changes of similar speed at the same time if the camera module 300 itself is moved.

Action 508

The host device 390 may perform an action on the object 520. The action may be to calculate for example size, speed, or direction that may be used to determine what sensor settings that is going to be used for the synchronous sensor if the host device 390 decides to take action to take an image or start a video.

When there is no further movement, and it is estimated that the moving object 520 has left the FOV, the camera module 300 may return to its low power state, e.g., to the asynchronous operating mode in which the change detectors 231, 232 are read. Thus, the method may return to action 501.

In the case of video capture, it may be estimated which framerate is required to get a good enough capture of the object's trajectory in the synchronous high-resolution mode.

For example, if it is calculated that the object 520 will move across the complete FOV in 100 ms, the highest frame rate of the camera module 300 in the synchronous mode may be activated (e.g. 120 Frames Per Second (FPS)), whereas if the object 520 will move across the FOV in 10 seconds, a substantially lower frame rate would be set (e.g. 10 FPS) to save power and communication bandwidth.

In the case of very fast movements, the camera module 300 may be automatically set to reduce the resolution and/or a color depth of the image sensor 200 in order to be able to achieve a higher frame rate, if the limiting factor is for example the bandwidth from the image sensor 200.

Furthermore, if the object 520 is estimated to only move across a subset of the FOV, the camera module 300 may crop the video capture to save bandwidth, either to save power or to enable a higher frame rate.

The settings of the camera module 300 will guide which tradeoffs discussed above shall apply.

Embodiments herein have described the hybrid image sensor 200 combining advantages of two technologies which enables several types of optimizations. The image sensor 200 comprises a conventional sensor array, i.e., the first pixel area 210, which may be based on an RGB color sensor array with high resolution. The image sensor 200 further comprises the second pixel area 220, which may be arranged as a frame around said RGB color sensor array with high resolution. the second pixel area 220 comprises at least two rows and two columns of hybrid second pixels 221, 222, e.g., DVS pixels. The array of hybrid second pixels 221, 222 may have significantly lower resolution than the conventional sensor array.

The conventional sensor array may have variable resolution and variable frame rate (where the maximum frame rate typically is limited by the resolution due to data transfer limitations and potentially also other limitations in the system, such as e.g., the need to conserve power and battery). The hybrid second pixels 221, 222 may detect rapid movements, due to its significantly higher frame rate and sensitivity to changes in luminance. The structuring of the hybrid second pixels 221, 222 in various shapes such as rows, columns or other appropriate geometries (crossed, circular or even embedded in the area occupied by the conventional sensor) of the second pixel area 220 enable an estimation of direction and speed of the movement of the object 520 across the field of view of the conventional sensor. The movements detected by the change detectors 231, 232 coupled to the hybrid second pixels 221, 222 may automatically adapt the settings of the conventional sensor, e.g., in the following ways:

From inactive to active, due to a detected activity such as motion, shape or optical characteristics such as changes in light conditions.

From active at low frame rate to a higher frame rate (enable use with variable frame rate, potentially with lower resolution or color depth) depending on the speed of the detected motion into the field-of-view (FOV).

Activation of only a part of the conventional sensor depending on how large the motion is, where it is, and its estimated trajectory (which later may be adjusted by the analysis of the high-resolution image sensor data).

Moderate the amount of sensing in terms of rate and resolution (instances of using more power demanding invocation of conventional sensor array) in accordance to a desired power profile such as battery saver mode or performance mode operation. For example, in some embodiments the camera module 300 is configured with different power profiles. Based on which of the power profiles that is a currently used power profile the object that is detected may change the sensor settings in different ways. High-power mode may lead to using full resolution and full frame rate whereas a low-power mode may set the image sensor 200 to half resolution and one fourth of maximum frame rate even though it is the same object entering the scene.

Based on the speed vector that may be calculated the camera sensor settings may be adjusted accordingly to adapt to the speed of the object 520, e.g., if it is important to capture the object 520 with optimised settings (exposure, focus, white balance).

Depending on the speed of the change detection (presumably much higher than the speed of the synchronous readout), more than 2 rows may be needed to estimate trajectories rather than just detecting the appearance of movement and the distribution of the object moving into the field-of-view.

Besides the functionality for activating the conventional image sensor based on changes in the field-of-view, there are other also more specific use cases enabled:

Detect movement (e.g., shaking) of the camera module 300 by the detection of movements in the image sensor itself, and when the device is still (i.e., movement below a certain threshold) and a picture will be captured by the conventional sensor. This can then be managed directly in the sensor circuit board (or silicon die), e.g., by the DPU 310, instead of via an application processor that would require utilizing input from an inertial motion unit (IMU) and/or an accelerometer. For example, the change detector triggers from the hybrid second pixels at different locations (spatially separated) may be analysed in order to determine if an image sensor is rotating or moved in a certain way. This may be used instead of using an accelerometer. A prerequisite may be that there are features (intensity changes) in the scene that trigger the change detectors.

Detect movement of objects by the detection of movements in the scene as detected by the change detectors 231, 232 based on output from the hybrid second pixels 221, 222.

Some advantages of embodiments herein is that when the image sensor 200 is used as a "normal" high-resolution sensor (which may utilize the first pixel area 210 or both the first pixel area 210 and the second pixel area 220) it may be operated with lower power than a prior art high-resolution image sensor, such as a synchronous frame-based image sensor. For example, the image sensor 200 may operate the synchronous part at low frame rate or in a low power mode until a motion into the FOV is detected by the asynchronous part of the image sensor 200. In other words, the synchronous part of the image sensor may be at least partially inactive or operate at a low frame rate until the output from the asynchronous change detectors triggers the camera module to activate the synchronous image sensor, e.g. based on a detected motion into the field of view based on the output from the asynchronous change detectors.

A further advantage is a possibility to detect a more rapid movement of the object 520 than what is possible with a conventional synchronous image sensor.

A yet further advantage is a possibility to automatically adjust settings, such as exposure, white balance, focus, etc., for the synchronous operating mode of the image sensor 200 depending on detected speed and direction of motions into the FOV (e.g., a projected motion across the optical sensor array).

A yet further advantage is a possibility to discriminate between objects moving at different speeds (different movement vectors). The camera module 300 may adjust sensor settings for one of the objects or try to set a setting which is suitable for both objects. As an example, a fast moving object and a slow moving object are captured by the event detectors. If the DPU 310 adjusts sensor settings based on the detection of the slow moving object the fast moving object may be blurred as the exposure time is not set to be able to capture that higher speed.

A yet further advantage is a possibility to improve motion sensitivity at low light conditions. For example, embodiments herein may dynamically use the event data of the change detectors to adjust an exposure of a synchronous image to accommodate for motions that would otherwise not be detected if the synchronous pixels are set to a fixed exposure value. Embodiments herein make it possible for the synchronous pixels to benefit from the speed and sensitivity of the event pixels. Thus embodiments take advantage of the hybrid image sensor comprising both a synchronous image sensor and an asynchronous image sensor.

Figure 6:
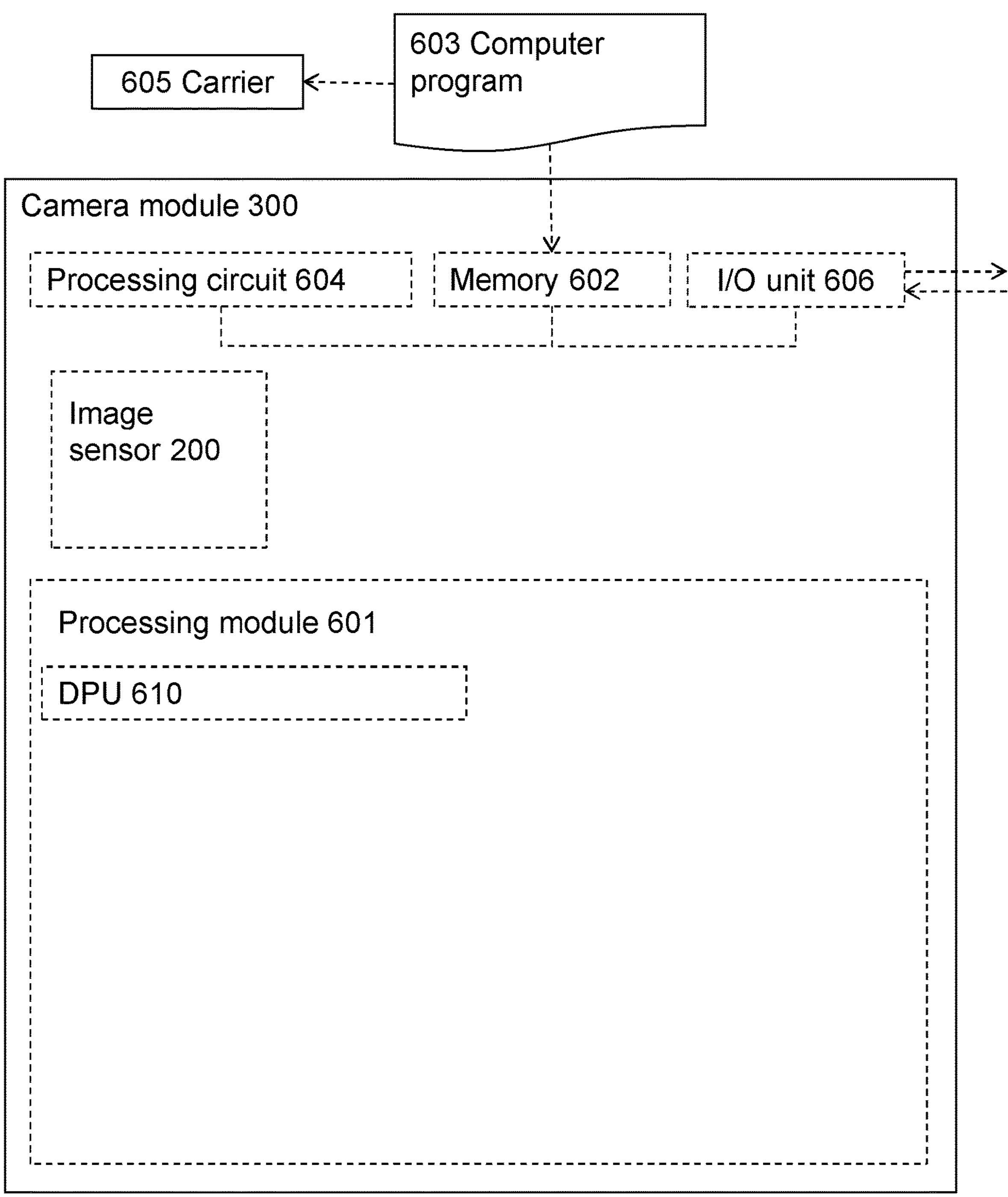
FIG. 6** is a schematic block diagram illustrating embodiments of a camera module.

FIG. 6 illustrates a supplementary schematic block diagram of embodiments of the camera module 300.

As mentioned above the camera module 300 comprises the image sensor 200 and may comprise any of the components described as part of the camera module 300 in connection with FIG. 3*a*.

In some embodiments the camera module 300 comprises a processing module 601 for performing the above method actions. The processing module 601 may comprise the DPU 310.

The embodiments herein may be also be implemented through a processing circuit 604 e.g. comprising one or more processors, in the camera module 300 depicted in FIG. 6, together with computer program code, e.g. computer program, for performing the functions and actions of the embodiments herein. The program code mentioned above may also be provided as a computer program product, for instance in the form of a data carrier carrying computer program code for performing the embodiments herein when being loaded into the camera module 300. One such carrier may be in the form of a CD ROM disc. It is however feasible with other data carriers such as a memory stick. The computer program code may furthermore be provided as pure program code on a server and downloaded to the camera module 300.

The camera module 300 may further comprise a memory 602 comprising one or more memory units. The memory 602 comprises instructions executable by the processing circuit 604 in the camera module 300. The memory 602 is arranged to be used to store e.g. information, indications, data, configurations, and applications to perform the methods herein when being executed in the camera module 300. The memory 602 may be a non-volatile memory e.g., comprising NAND gates, from which the camera module 300 may load its program and relevant data. Updates of the software may be transferred via a wireless connection.

To perform the actions above, embodiments herein provide a computer program 603, comprising computer readable code units which when executed on the camera module 300 causes the camera module 300 to perform any of the method actions above.

In some embodiments, the computer program 603 comprises instructions, which when executed by a processor, such as the processing circuit 604 of the camera module 300, cause the processor to perform any of the method actions above.

In some embodiments, a carrier 605 comprises the computer program 603 wherein the carrier 605 is one of an electronic signal, an optical signal, an electromagnetic signal, a magnetic signal, an electric signal, a radio signal, a microwave signal and a computer-readable storage medium.

To perform the method actions above, the camera module 300 may comprise an Input and Output (I/O) unit 606. The I/O unit 606 may further be part of one or more user interfaces.

Those skilled in the art will appreciate that the modules and/or units in the camera module 300 described above may refer to a combination of analog and digital circuits, and/or one or more processors configured with software and/or firmware, e.g., stored in the camera module 300, that when executed by, e.g., the processing circuit 604, above causes the camera module 300 to perform the method actions above. The processing circuit 604, as well as the other digital hardware, may be included in a single Application-Specific Integrated Circuitry (ASIC), or several processors and various digital hardware may be distributed among several separate components, whether individually packaged or assembled into a system-on-a-chip (SoC).

As used herein, the term "module" and the term "unit" may refer to one or more functional modules or units, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a cavity-providing means, electrical interconnect-providing means and arranging means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A monolithic image sensor comprising:

a pixel area sensitive to electromagnetic irradiation and comprising: a first pixel area comprising an array of synchronous first image sensor pixels, and a second pixel area comprising hybrid second image sensor pixels;

multiple asynchronous change detectors; and a synchronous intensity read-out circuitry, wherein:

a first photoreceptor of a respective first image sensor pixel is electrically coupled to the synchronous intensity read-out circuitry, a second photoreceptor of a respective hybrid second image sensor pixel is electrically coupled to the synchronous intensity read-out circuitry with a first connection and is electrically coupled to a respective asynchronous change detector out of the multiple asynchronous change detectors with a second connection, the second pixel area at least partly surrounds the first pixel area, and the multiple asynchronous change detectors are in a change detector area that is outside of the first and second pixel areas and that at least partly surrounds the second pixel area.

2. The image sensor of claim 1, wherein a first pixel density of the first pixel area equals a second pixel density of the second pixel area.

3. The image sensor of claim 1, wherein the second pixel area further comprises third image sensor pixels, wherein a third photoreceptor of a respective third image sensor pixel is electrically coupled to the synchronous intensity read-out circuitry but not electrically coupled to the asynchronous change detectors.

4. The image sensor of claim 1, wherein the respective second image sensor pixel comprises a green color filter.

5. The image sensor of claim 1, wherein the respective second image sensor pixel comprises two or more different color filters.

6. The image sensor of claim 1, wherein the image sensor is configured to operate the second image sensor pixels either in an asynchronous mode, in which the respective asynchronous change detector asynchronously outputs a signal if a significant change in illumination intensity of the corresponding photoreceptor is detected, or in a synchronous mode, in which the synchronous intensity read-out circuitry synchronously outputs a respective pixel value corresponding to a respective illumination intensity of the corresponding photoreceptor.

7. A camera module comprising the monolithic image sensor of claim 1 and further comprising a Digital Processing Unit (DPU) configured to:

determine a setting of the image sensor based on output from the asynchronous change detectors comprised in the image sensor, and control the image sensor by implementing the setting.

8. The camera module of claim 7, wherein the DPU and the monolithic image sensor are monolithically integrated.

9. The camera module of claim 7, wherein the DPU is configured to:

determine a characteristic of an object captured by the image sensor based on the output from the asynchronous change detectors, and then determine the setting of the image sensor based on the characteristic.

10. The camera module of claim 7, wherein the DPU is configured to:

operate the camera module in an asynchronous operating mode in which the camera module reads output from the change detectors, and control the image sensor by implementing the setting by being configured to change operating mode from the asynchronous operating mode to a synchronous operating mode, in which the camera module reads output from the synchronous intensity read-out circuitry, based on the output from the change detectors.

11. The camera module of claim 7, wherein the DPU is configured to:

capture, in the synchronous operating mode, a synchronous image frame based on the output from the synchronous intensity read-out circuitry, transmit the image to a host device and/or discard the image, and change operating mode from the synchronous operating mode to the asynchronous operating mode in response to transmitting or discarding the image.

12. A method for operating a camera module comprising the image sensor of claim 1 and a Digital Processing Unit (DPU), wherein the method comprises:

determining, by the DPU, a setting of the image sensor based on output from the asynchronous change detectors of the image sensor, and controlling the image sensor by implementing the setting.

13. The method of claim 12, wherein determining the setting comprises determining one or more of: a power setting, an exposure setting, a white balance setting, a focus setting, a resolution setting, an image size setting, and a frame rate.

14. The method of claim 12, wherein determining the setting comprises determining a characteristic of an object captured by the image sensor based on the output from the asynchronous change detectors, and determining a setting of the image sensor based on the determined characteristic.

15. The method of claim 12, further comprising:

operating the camera module in an asynchronous operating mode in which the camera module reads output from the change detectors, wherein controlling the image sensor by implementing the setting comprises changing operating mode from the asynchronous operating mode to a synchronous operating mode in which the camera module reads output from the synchronous intensity read-out circuitry, and wherein changing operating mode is based on the output from the change detectors.

16. The method of claim 12, further comprising:

capturing, in the synchronous operating mode, a synchronous image frame based on the output from the synchronous intensity read-out circuitry, transmitting the synchronous image frame to a host device and/or discarding the synchronous image frame, and changing operating mode from the synchronous operating mode to the asynchronous operating mode in response to transmitting or discarding the synchronous image frame.

17. The method of claim 12, wherein the output from the asynchronous change detectors comprises a first output associated with a first hybrid pixel followed by a second output from a neighbouring hybrid pixel, and wherein the method further comprises:

capturing multiple synchronous image frames with the synchronous intensity read-out circuitry in response to detecting the output from the asynchronous change detectors.

18. The method of claim 12, further comprising:

analyzing the synchronous image frame, determining, based on analyzing the synchronous image frame, to change how the setting of the image sensor is determined by the output from the asynchronous change detectors.

* * * * *